US012650612B2

(12) United States Patent
Jhang et al.

(10) Patent No.: US 12,650,612 B2
(45) Date of Patent: Jun. 9, 2026

(54) FLOATING IMAGE DEVICE

(71) Applicant: DARWIN PRECISIONS CORPORATION, Hsinchu County (TW)

(72) Inventors: Syuan-Wei Jhang, Hsinchu County (TW); Chih-Ping Hsu, Hsinchu County (TW); Ya Han Ko, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 478 days.

(21) Appl. No.: 18/195,912

(22) Filed: May 10, 2023

(65) Prior Publication Data

US 2024/0184131 A1 Jun. 6, 2024

(30) Foreign Application Priority Data

Dec. 2, 2022 (TW) .................................. 111146352

(51) Int. Cl.
| | |
|---|---|
| *G02B 30/56* | (2020.01) |
| *G02B 3/08* | (2006.01) |
| *G02B 27/30* | (2006.01) |
| *G06F 3/01* | (2006.01) |

(52) U.S. Cl.
CPC .............. *G02B 30/56* (2020.01); *G02B 3/08* (2013.01); *G02B 27/30* (2013.01); *G06F 3/016* (2013.01)

(58) Field of Classification Search
CPC .......... G02B 30/56; G02B 3/08; G02B 27/30; G02B 3/0056; G06F 3/016; G09F 19/12
See application file for complete search history.

(56) References Cited

U.S. PATENT DOCUMENTS

2021/0342031 A1 11/2021 Huang et al.
2022/0335745 A1* 10/2022 Lai ........................ G06F 3/0436

FOREIGN PATENT DOCUMENTS

| | | |
|---|---|---|
| CN | 102282500 A | 12/2011 |
| JP | H10232380 A | 9/1998 |
| JP | 2011100037 A | 5/2011 |
| JP | 2012174370 A | 9/2012 |
| JP | 2018018706 A | 2/2018 |
| TW | 201908115 A | 3/2019 |
| TW | 770949 B | 7/2022 |
| TW | 202242936 A | 11/2022 |

* cited by examiner

*Primary Examiner* — James C. Jones

(57) ABSTRACT

A floating image device includes a collimating optical assembly, a light source assembly, an imaging unit, and a microlens array. The light source assembly is suitable for emitting a beam to the collimating optical assembly, the beam is converted into a collimated beam by the collimating optical assembly, and a spread angle of the collimated beam at a half-intensity position is smaller than +/−15°. The imaging unit is arranged on one side of the collimating optical assembly that is away from the light source assembly, and the collimated beam is suitable for being converted into an image beam by the imaging unit in a collimated manner; and the microlens array is arranged on one side of the imaging unit. The microlens array focuses the image beam and projects a focused image beam into a floating image. The floating image device is capable of making the floating image clear.

9 Claims, 5 Drawing Sheets

FLOATING IMAGE DEVICE

FIELD OF THE INVENTION

The present invention relates to a floating image device, and more particularly to a floating image device capable of making a floating image clear.

BACKGROUND OF THE INVENTION

Since key bodies must be directly contacted during operation of physical mechanical keys, wear is inevitably caused after long-term use, thereby shortening the service life. In addition, when the physical mechanical keys are arranged in public places, there are a larger number of contacts, and there easily exists health concerns about the attachment of infectious pathogens such as viruses and bacteria. To reduce or avoid the above defects and/or risks that may be caused based on contact, a technology of forming a default floating image for identification and even further corresponding operation comes into being.

SUMMARY OF THE INVENTION

The present invention provides a floating image device, which is capable of making a floating image clear and reducing secondary image interference of a side angle of view.

The floating image device provided by the present invention includes a collimating optical assembly, a light source assembly, an imaging unit, and a microlens array. The light source assembly corresponds to the collimating optical assembly, the light source assembly is suitable for emitting a beam to the collimating optical assembly, the beam is converted into a collimated beam by the collimating optical assembly, and a spread angle of the collimated beam at a half-intensity position is smaller than +/−15°; the imaging unit is arranged on one side of the collimating optical assembly that is away from the light source assembly, so that the collimating optical assembly is located between the light source assembly and the imaging unit, and the collimated beam is suitable for being converted into an image beam by the imaging unit in a collimated manner; and the microlens array is arranged on one side of the imaging unit that is away from the collimating optical assembly, and the microlens array focuses the image beam and projects a focused image beam into a floating image.

In an embodiment of the present invention, there are a plurality of light source assemblies, there are a plurality of collimating optical assemblies, the number of the collimating optical assemblies corresponds to the number of the light source assemblies, and the collimating optical assemblies are in one-to-one correspondence with the light source assemblies.

In an embodiment of the present invention, an arrangement of the above optical assemblies or light source assemblies may be a matrix arrangement, a hexagonal arrangement, or a polygonal arrangement.

In an embodiment of the present invention, the above floating image device further includes a floating touch module, where the floating image is located in a default image display region, the floating touch module is arranged between the microlens array and the default image display region, the floating touch module has a floating touch sensing region, and the floating touch sensing region covers the default image display region.

In an embodiment of the present invention, the above floating touch sensing region is within a range from 0 cm to 10 cm above the floating touch module.

In an embodiment of the present invention, a distance between the above collimating optical assembly and light source assembly is between 0 mm and 50 mm.

In an embodiment of the present invention, the above light source assembly includes a light-emitting diode.

In an embodiment of the present invention, the above collimating optical assembly includes a substrate and a plurality of microstructures, the substrate includes an upper surface and a lower surface opposite to each other, the upper surface faces the imaging unit, and the microstructures are formed on any one or both of the upper surface and the lower surface.

In an embodiment of the present invention, the above microstructures include a plurality of V-shaped grooves, and the V-shaped grooves are arranged in a manner of any one or both of equal spacing and equal depth.

In an embodiment of the present invention, a spacing between adjacent two of the above V-shaped grooves is between 10 um and 500 um, and a depth of the V-shaped grooves is between 10 um and 500 um.

In an embodiment of the present invention, the above substrate is made from polymethyl methacrylate (PMMA), polyethylene terephthalate (PET), or polycarbonate (PC).

In an embodiment of the present invention, the above collimating optical assembly is formed by means of an ultraviolet imprinting, injection or hot flat pressing process.

In an embodiment of the present invention, the above collimating optical assembly is a Fresnel lens.

According to the present invention, since a light source emitted by the light source assembly is converted into a collimated light source with a uniform surface by using the collimating optical assembly, the image beam passing through an imaging film may be accurately incident into the corresponding microlens array, so that the floating image device is clear in imaging and reduces the secondary image interference of the side angle of view.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
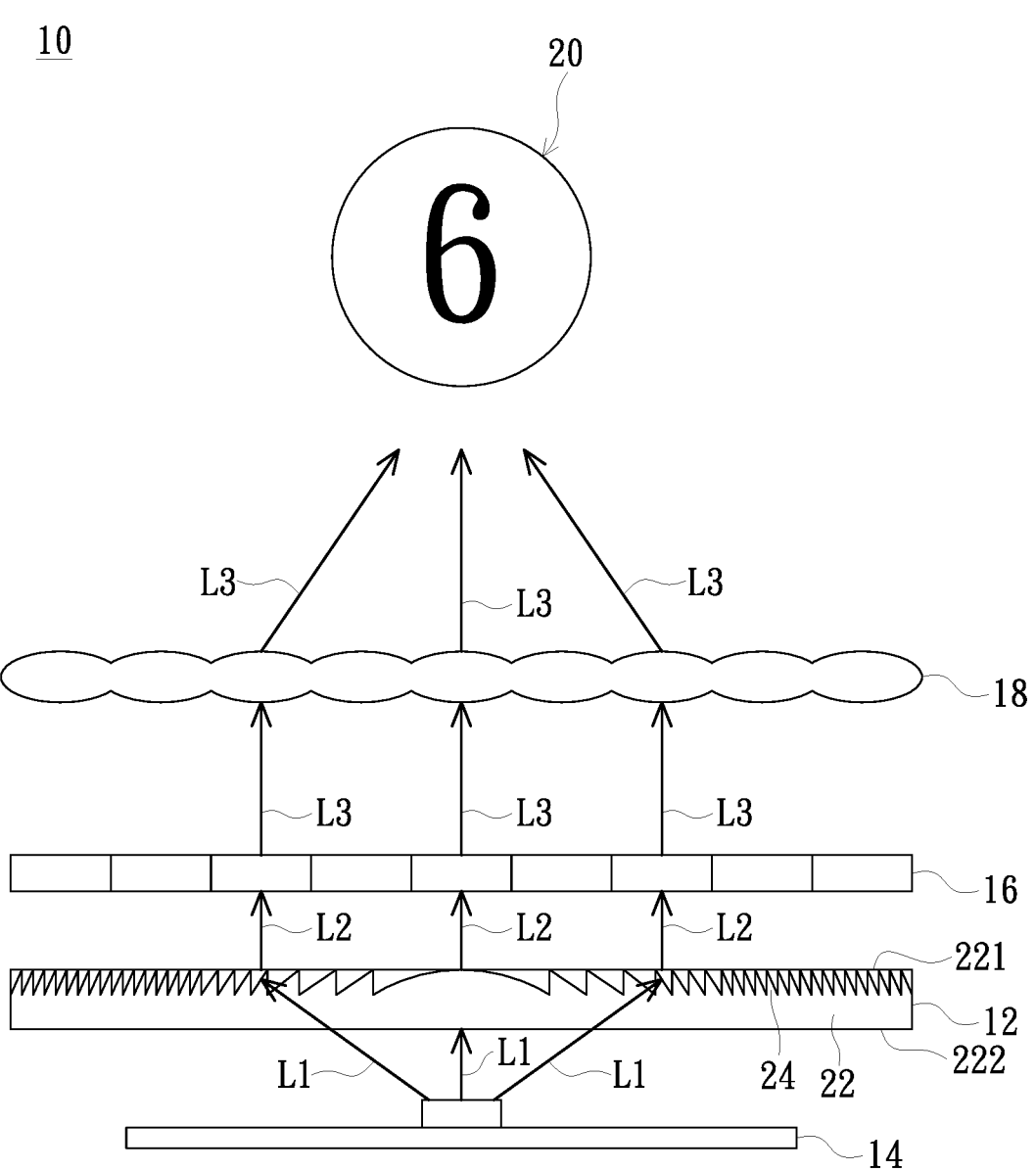
FIG. 1 is a schematic diagram of a floating image device according to an embodiment of the present invention.
Figure 2:
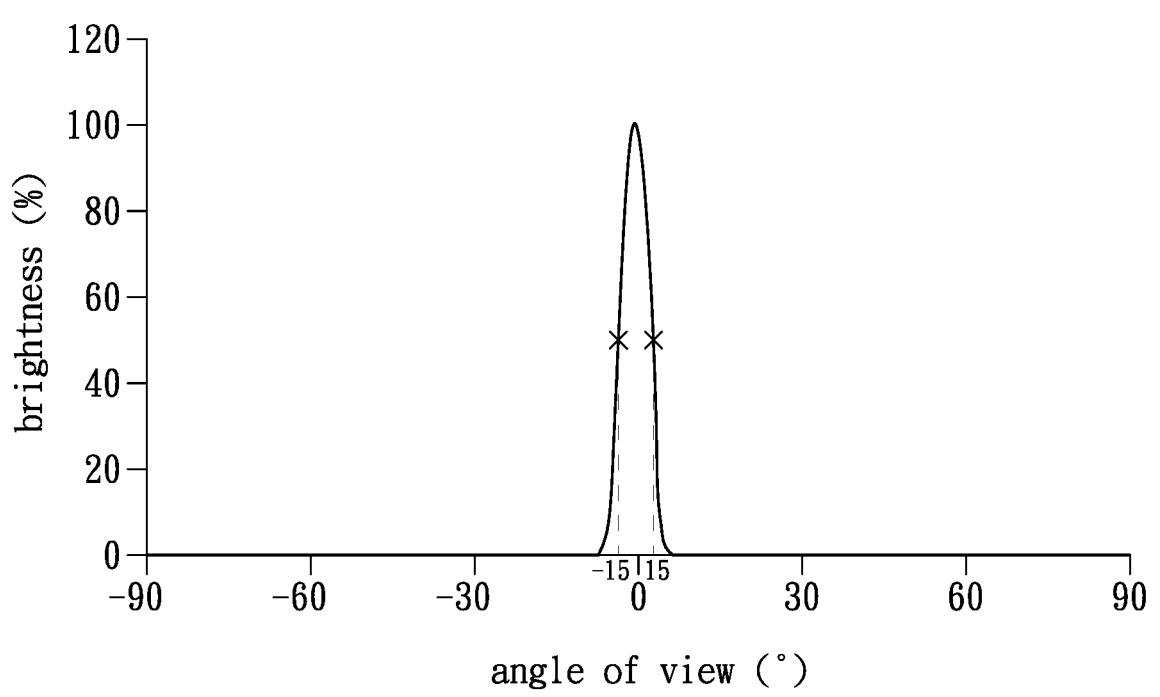
FIG. 2 is a schematic diagram of distribution of the brightness of a collimated beam to an angle of view according to an embodiment of the present invention.

FIG. 1 is a schematic diagram of a floating image device according to an embodiment of the present invention. As shown in FIG. 1, the floating image device 10 includes a collimating optical assembly 12, a light source assembly 14, an imaging unit 16, and a microlens array 18. The light source assembly 14 corresponds to the collimating optical assembly 12, the light source assembly 14 is suitable for emitting a beam L1 to the collimating optical assembly 12, the beam L1 is converted into a collimated beam L2 by the collimating optical assembly 12, and a spread angle of the collimated beam L2 at a half-intensity position is smaller than +/−15°. FIG. 2 is a schematic diagram of distribution of the brightness of a collimated beam to an angle of view according to an embodiment of the present invention. As shown in FIG. 2, when the brightness in a 0° direction is 100%, the angle of view when the brightness is 50% is smaller than +/−15°.

Continuing with the above description, as shown in FIG. 1, the imaging unit 16 is arranged on one side of the collimating optical assembly 12 that is away from the light source assembly 14, and the microlens array 18 is arranged on one side of the imaging unit 16 that is away from the collimating optical assembly 12, that is, the light source assembly 14, the collimating optical assembly 12, the imaging unit 16, and the microlens array 18 are arranged in sequence. The collimating optical assembly 12 is located between the light source assembly 14 and the imaging unit 16, and the collimated beam L2 is suitable for being converted into an image beam L3 by the imaging unit 16 in a collimated manner; and the microlens array 18 focuses the image beam L3 and projects a focused image beam into a floating image 20. In an embodiment, the imaging unit 16 may be a negative film having a default pattern, a photomask, or a coated film; and the microlens array 18 may be a double convex lens array, but is not limited thereto, and the microlens array 18 may alternatively be a single convex lens array.

Figure 3:
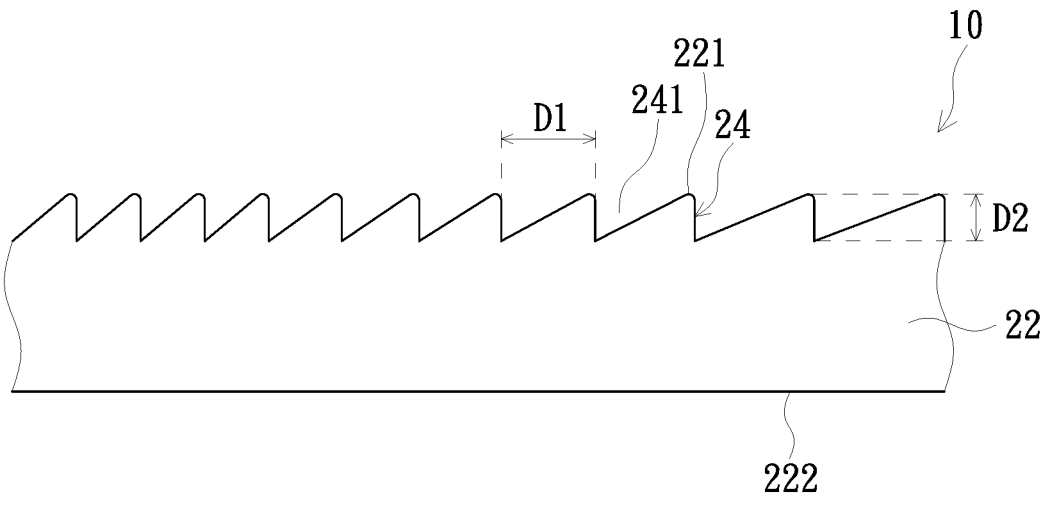
FIG. 3 is a schematic diagram of a sectional structure of a collimating optical assembly according to an embodiment of the present invention.

The collimating optical assembly 12 includes a substrate 22 and a plurality of microstructures 24. FIG. 3 is a schematic diagram of a sectional structure of a collimating optical assembly according to an embodiment of the present invention. As shown in FIG. 1 and FIG. 3, the substrate 22 includes an upper surface 221 and a lower surface 222 opposite to each other, the lower surface 222 faces the light source assembly 14, the upper surface 221 faces the imaging unit 16, and the microstructures 24 are formed on the upper surface 221, which is not limited thereto. In an embodiment not shown, the microstructures 24 may be formed on the lower surface 222, or the microstructures 24 are formed on both the upper surface 221 and the lower surface 222. In an embodiment, the microstructures 24 include a plurality of V-shaped grooves 241, the V-shaped grooves 241 are, for example, arranged in a circular shape, and the plurality of V-shaped grooves 241 may be, for example, arranged in a manner of any one or both of equal spacing and equal depth. FIG. 3 is an example where the plurality of V-shaped grooves 241 are arranged in a manner of equal depth. In an embodiment, a spacing D1 between the two adjacent V-shaped grooves 241 is between 10 um and 500 um, and a depth D2 of the V-shaped grooves 241 is between 10 um and 500 um. The substrate 22 is made from, for example, polymethyl methacrylate (PMMA), polyethylene terephthalate (PET), or polycarbonate (PC). In an embodiment, the collimating optical assembly 12 may be formed by means of an ultraviolet imprinting (UV imprinting), injection or hot flat pressing process. In another embodiment, the collimating optical assembly 12 is a Fresnel lens.

Figure 4:
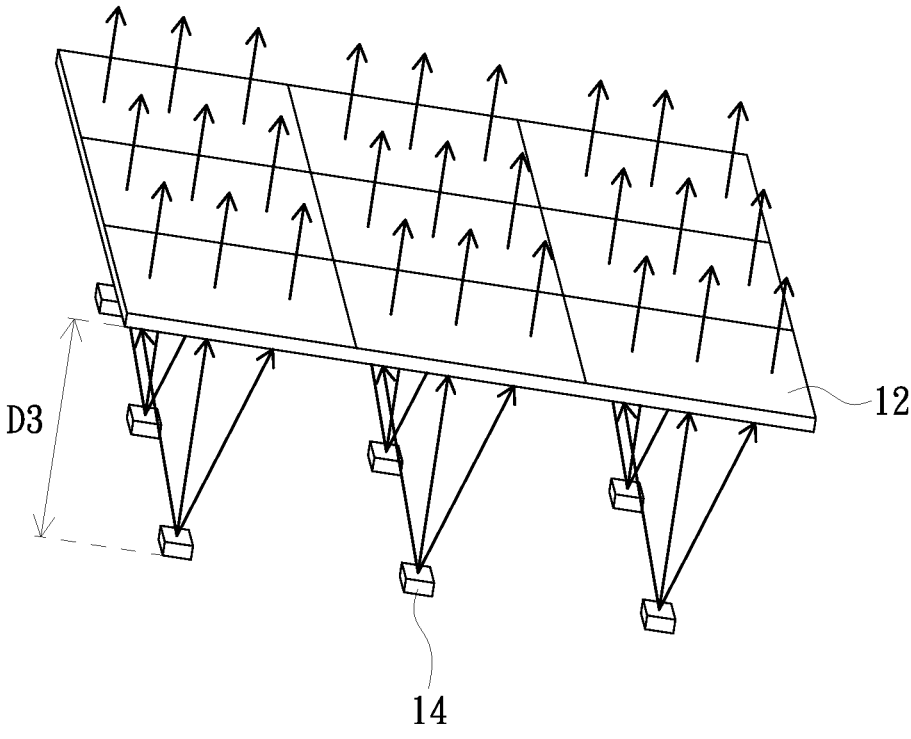
FIG. 4 is a schematic diagram of configuration of a light source assembly and a collimating optical assembly according to an embodiment of the present invention.

FIG. 4 is a schematic diagram of configuration of a light source assembly and a collimating optical assembly according to an embodiment of the present invention. As shown in FIG. 4, in an embodiment, there are a plurality of light source assemblies 14, there are a plurality of collimating optical assemblies 12, the number of the collimating optical assemblies 12 corresponds to the number of the light source assemblies 14, and the collimating optical assemblies 12 are in one-to-one correspondence with the light source assemblies 14. In an embodiment, an arrangement of the collimating optical assemblies 12/the light source assemblies 14 may be a matrix arrangement, a hexagonal arrangement, or a polygonal arrangement. In addition, in an embodiment, a distance D3 between the collimating optical assembly 12 and the light source assembly 14 may be between 0 mm and 50 mm, that is, the light source assembly 14 may be clung to the collimating optical assembly 12 or spaced from the collimating optical assembly 12 by a distance of below 50 mm.

Figure 5:
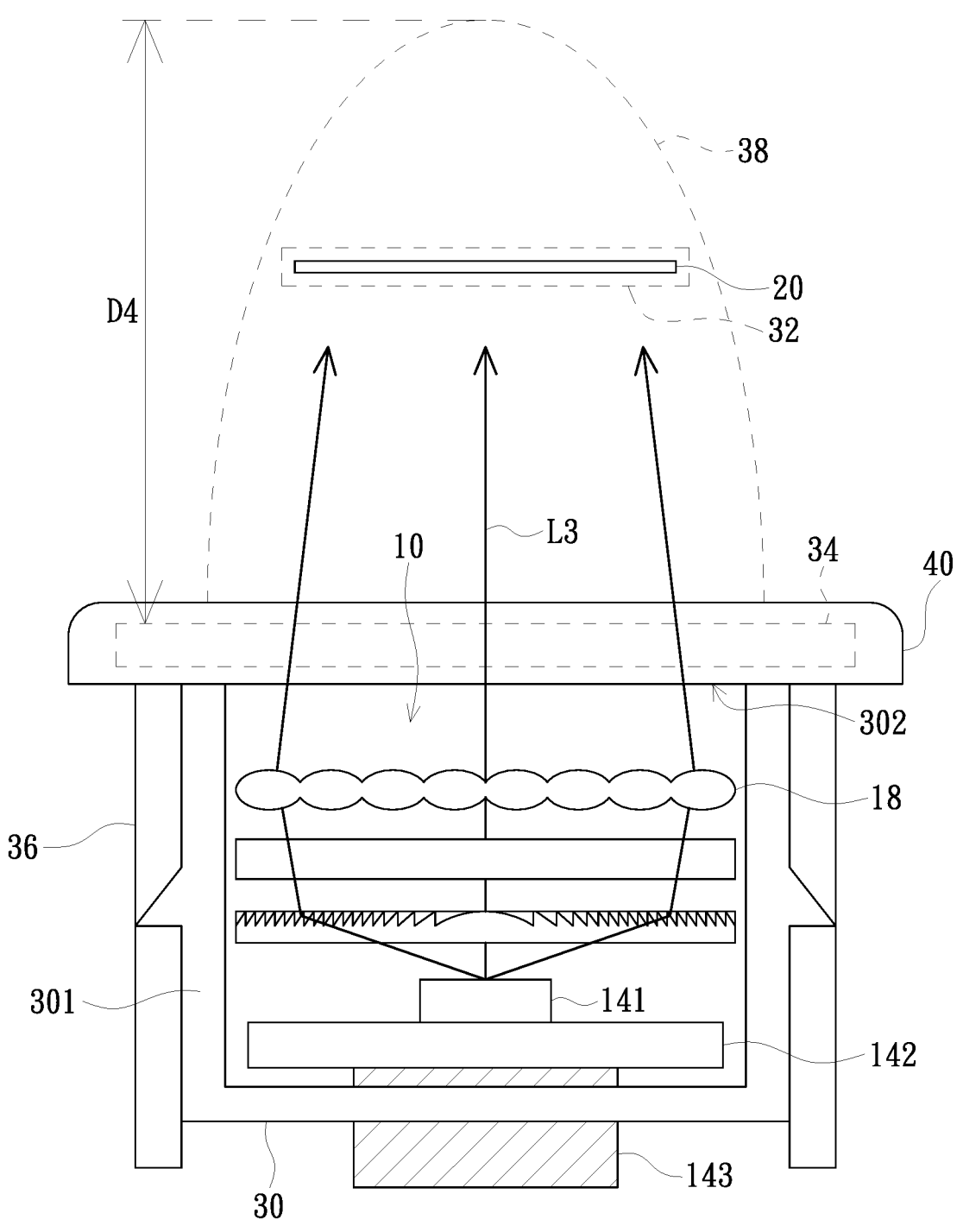
FIG. 5 is a schematic diagram of application of a floating image device according to an embodiment of the present invention.

FIG. 5 is a schematic diagram of application of a floating image device according to an embodiment of the present invention, where the floating image device 10 is arranged in an accommodating cavity 30; and the optical assembly 14 includes, for example, a light-emitting diode (LED) 141, a circuit substrate 142, and a connecting structure 143, the circuit substrate 142 is arranged at a bottom of the accommodating cavity 30, the light-emitting diode 141 is arranged on the circuit substrate 142, and the connecting structure 143 is electrically connected to the circuit substrate 142 and is externally connected to a power source, a control device, or other device. In addition, the floating image 20 is presented in a default image display region 32 outside the accommodating cavity 30.

With continued reference to FIG. 5, the floating image device 10 further includes a floating touch module 34 arranged between the microlens array 18 and the default image display region 32. Specifically, a wall body 301 of the accommodating cavity 30 is defined with a frame 36, and the wall body 301 may define an opening 302 that faces the default image display region 32; and the floating touch module 34 is arranged on the opening 302, the floating touch module 34 has a floating touch sensing region 38, and the floating touch sensing region 38 is, for example, located directly above the floating touch module 34 and covers the default image display region 32. In an embodiment, the floating touch sensing region 38 is within a range from 0 cm to 10 cm above the floating touch module 34, that is, a distance D4 between a highest point of the floating touch sensing region 38 and the floating touch module 34 is between 0 cm and 10 cm. In addition, as shown in FIG. 5, in an embodiment, the frame 36 further includes a transparent cover plate 40 capable of allowing the image beam L3 to pass through, covers the opening 302 of the accommodating cavity 30, and wraps the floating touch module 34, to achieve the effects of beauty, protection, and the like.

Figure 6:
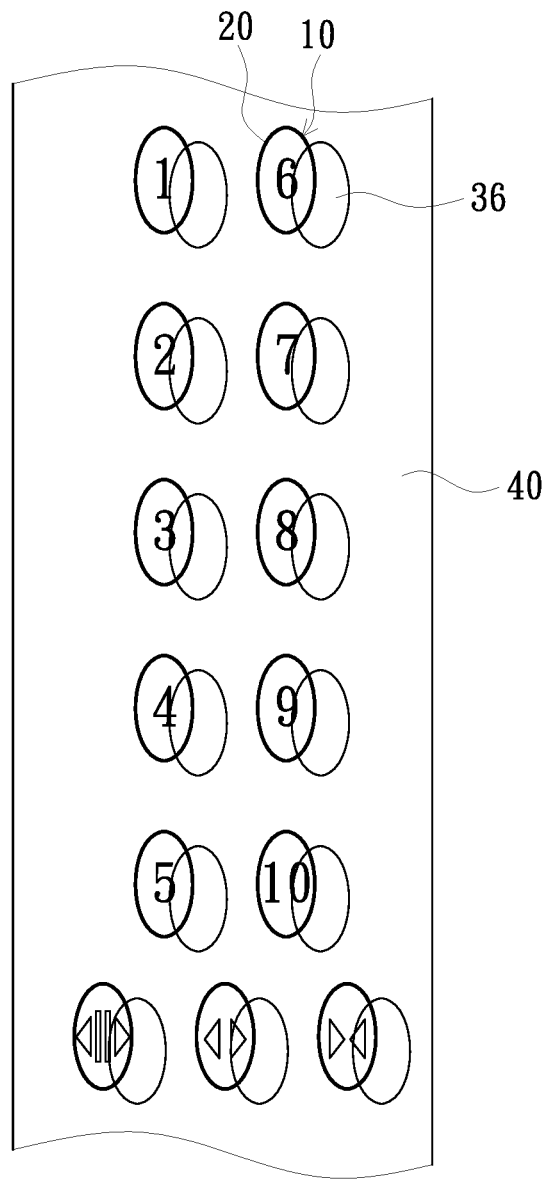
FIG. 6 is a schematic diagram of a floating image device as a floating display touch button according to an embodiment of the present invention.

FIG. 6 is a schematic diagram of a floating image device as a floating display touch button according to an embodiment of the present invention. As shown in FIG. 6, the floating image device 10, as the floating display touch button, is arranged on a key panel 40 of, for example, an elevator or an automatic teller machine (ATM), and is compatible with a shape and an electrical signal of an existing switch module of the elevator/the automatic teller machine, where the frame 36 of the floating image device 10 is accommodated in the key panel 40, and the floating image 20, such as a digital image, is presented in a floating manner above the key panel 40.

According to the above, in the floating image device of an embodiment of the present invention, since a light source emitted by the light source assembly is converted into a collimated light source with a uniform surface by using the collimating optical assembly, the image beam passing through an imaging film may be accurately incident into the corresponding microlens array, so that the floating image device is clear in imaging and reduces secondary image interference of a side angle of view.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A floating image device, comprising:
a plurality of collimating optical assemblies;
a plurality of light source assemblies corresponding to the collimating optical assemblies, wherein the number of the collimating optical assemblies corresponds to the number of the light source assemblies, the collimating optical assemblies are in one-to-one correspondence with the light source assemblies, and each of the light source assemblies is suitable for emitting a beam to each of the collimating optical assemblies, the beam is converted into a collimated beam by each of the collimating optical assemblies, and a spread angle of the collimated beam at a half-intensity position is smaller than +/−15°;
an imaging unit arranged on one side of the collimating optical assemblies that is away from the light source assemblies, wherein the collimating optical assemblies are located between the light source assemblies and the imaging unit, and the collimated beam is suitable for being converted into an image beam by the imaging unit in a collimated manner; and
a microlens array arranged on one side of the imaging unit that is away from the collimating optical assemblies, wherein the microlens array focuses the image beam and projects a focused image beam into a floating image, wherein an arrangement of the collimating optical assemblies or the light source assemblies is a matrix arrangement, a hexagonal arrangement, or a polygonal arrangement,
wherein each of the collimating optical assemblies comprises a substrate and a plurality of microstructures, and the substrate is made from polymethyl methacrylate (PMMA), polyethylene terephthalate (PET), or polycarbonate (PC),
wherein the collimating optical assemblies are formed by means of an ultraviolet imprinting, injection or hot flat pressing process.

2. The floating image device according to claim 1, further comprising a floating touch module, wherein the floating image is located in a default image display region, the floating touch module is arranged between the microlens array and the default image display region, the floating touch module has a floating touch sensing region, and the floating touch sensing region covers the default image display region.

3. The floating image device according to claim 2, wherein the floating touch sensing region is within a range from 0 cm to 10 cm above the floating touch module.

4. The floating image device according to claim 1, wherein a distance between the collimating optical assemblies and the light source assemblies is between 0 mm and 50 mm.

5. The floating image device according to claim 1, wherein each of the light source assemblies comprises a light-emitting diode.

6. The floating image device according to claim 1, wherein the substrate comprises an upper surface and a lower surface opposite to each other, the upper surface faces the imaging unit, and the plurality of microstructures are formed on any one or both of the upper surface and the lower surface.

7. The floating image device according to claim 6, wherein the plurality of microstructures comprise a plurality of V-shaped grooves, and the plurality of V-shaped grooves are arranged in a manner of any one or both of equal spacing and equal depth.

8. The floating image device according to claim 6, wherein a spacing between adjacent two of the plurality of V-shaped grooves is between 10 um and 500 um, and a depth of the plurality of V-shaped grooves is between 10 um and 500 um.

9. The floating image device according to claim 1, wherein each of the collimating optical assemblies is a Fresnel lens.

* * * * *